US008639535B1

(12) United States Patent
Kazenas

(10) Patent No.: US 8,639,535 B1
(45) Date of Patent: Jan. 28, 2014

(54) SYSTEM AND METHOD FOR PROVIDING FINANCIAL PRODUCTS FOR A DEDUCTIBLE PORTION OF AN INSURANCE POLICY

(75) Inventor: Joseph Alfred Kazenas, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 812 days.

(21) Appl. No.: 12/500,671

(22) Filed: Jul. 10, 2009

(51) Int. Cl.
  *G06Q 40/00* (2012.01)
(52) U.S. Cl.
  USPC ........... 705/4; 705/2; 705/38; 705/39; 705/40
(58) Field of Classification Search
  USPC .................................. 705/4, 15–45
  See application file for complete search history.

(56) References Cited

U.S. PATENT DOCUMENTS

| | | | |
|---|---|---|---|
| 4,642,768 A | 2/1987 | Roberts | |
| 4,839,804 A | 6/1989 | Roberts et al. | |
| 5,802,500 A | 9/1998 | Ryan et al. | |
| 7,246,068 B2 * | 7/2007 | Thomas, Jr. | 705/2 |
| 7,797,174 B2 * | 9/2010 | Samuels | 705/4 |
| 2005/0108028 A1 * | 5/2005 | Arehart | 705/1 |
| 2006/0129436 A1 * | 6/2006 | Short | 705/4 |
| 2006/0242057 A1 * | 10/2006 | Velarde | 705/38 |
| 2008/0103839 A1 * | 5/2008 | O'Brien | 705/4 |
| 2008/0126247 A1 | 5/2008 | Traylor | |
| 2008/0306777 A1 * | 12/2008 | Fell et al. | 705/4 |

OTHER PUBLICATIONS

"The Role of Insurance in Corporate Risk Finance", Review of Business, Jean W Kwon, Fall 2003, v24n3, pp. 36-40. Retrieved from Dialog.*
Klein, Allison: "How Car Insurance Works", HowStuffWorks.com, 2 pages.

* cited by examiner

*Primary Examiner* — Hai Tran
(74) *Attorney, Agent, or Firm* — Brooks, Cameron & Huebsch, PLLC

(57) ABSTRACT

Methods and systems for providing supplemental insurance to insure the deductible amount of a primary insurance policy are described. In an example, data is received about a first insurance policy of an insured party; a deductible amount of the first insurance policy is determined; a premium to insure the deductible amount is determined using a computing device and a second insurance policy for the deductible amount is offered to the insured party. In an example, the first insurance policy may be provided by a third party provider. In an example, all of the deductible amounts of the insured party's insurance policies may be added and supplemental insurance for the total deductible amount offered. In an example, the deductible amounts of a group of insured members may be added and supplemental insurance for the total deductible amount offered. In an example, the deductible amount of an insurance policy may be added to a loan.

30 Claims, 10 Drawing Sheets

SYSTEM AND METHOD FOR PROVIDING FINANCIAL PRODUCTS FOR A DEDUCTIBLE PORTION OF AN INSURANCE POLICY

FIELD

This application relates to methods and systems for providing insured individuals or parties, a financial product that covers the deductible portion of their insurance policies in the event of a claim. The financial product would pay the deductible portion of an insured party's policy in the event of a claim.

BACKGROUND

Insurance policies frequently have deductible amounts. The deductible is a monetary amount that the insured party must first satisfy or pay before the insurance policy will provide payment for a claim. Auto insurance policies frequently have a deductible of $1000. If the insured party is in an accident, the insured party must pay the first $1000 of any damages before the insurance company is required to pay any of the damages beyond $1000. For many individuals and insured parties, obtaining the deductible amount can be a major obstacle. In some situations, money for a deductible does not exist or may cause other important needs to go unfilled.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, a computerized method, and system for performing the method can include receiving data about a first insurance policy of an insured party, determining a deductible amount of the first insurance policy, determining a premium to insure the deductible amount using a computing device and offering a second insurance policy for the deductible amount to the insured party. The method can include receiving the premium for the second insurance policy. The method can include a first company providing the first insurance policy and a second company providing the second insurance policy. The method can include the premium being automatically deducted on a periodic basis. The method can include receiving data about a plurality of insurance policies. The method can include the computing device determining the premium using underwriting data stored on the computing device. The method can include paying the deductible amount in the event of a claim against the first insurance policy.

In an example, a computerized method, and system for performing the method can include receiving data about an insurance policy of an insured party from a third party computer system, determining a deductible amount of the insurance policy, determining a premium for the deductible amount using a computing device and offering a supplemental insurance policy for the deductible amount to the insured party. The method can include receiving the premium for the supplemental insurance policy. The method can include time period that the supplemental insurance policy is in effect coinciding with the time period that the insurance policy is in effect. The method can include the premium being automatically deducted on a periodic basis. The method can include receiving data about a plurality of insurance policies. The method can include determining the premium using underwriting data stored on the computing device. The method can include paying the deductible amount in the event of a claim against the supplemental insurance policy.

In an example, a computerized method, and system for performing the method can include receiving data about a plurality of insurance policies of an insured party, calculating a total deductible amount for all of the insurance policies using a computing device, determining a premium for the total deductible amount using the computing device and offering a supplemental insurance policy for the total deductible amount to the insured party. The method can include receiving the premium for the supplemental insurance policy. The method can include allowing the insured party to select which of the insurance policy deductibles are to be covered by the supplemental insurance policy. The method can include the premium being automatically deducted on a periodic basis. The method can include the plurality of insurance policies consisting of at least one of an auto insurance policy, a home insurance policy, a renter's insurance policy, a boat insurance policy, a motorcycle insurance policy or a recreational vehicle insurance policy. The method can include the computing device determining the premium using underwriting data stored on the computing device. The method can include paying a first deductible amount in the event of a claim against the supplemental insurance policy.

In an example, a computerized method, and system for performing the method can include receiving data about a plurality of insurance policies for a plurality of insured parties, the plurality of insured parties forming a group, calculating a total deductible amount for all of the insurance policies of the group using a computing device, determining a premium to insure the total deductible amount using the computing device and offering a supplemental insurance policy for the total deductible amount to the group. The method can include receiving the premium for the supplemental insurance policy. The method can include allowing at least one of the insured parties to select which of the insurance policy deductibles are to be covered by the supplemental insurance policy. The method can include the premium being automatically deducted on a periodic basis. The method can include the group consisting of at least one of an immediate family, an extended family, employees of a business, or members of an organization. The method can include a primary policy holder being responsible for payment of the premium for the supplemental insurance policy. The method can include paying a first deductible amount in the event of a claim against the supplemental insurance policy.

In an example, a computerized method, and system for performing the method can include receiving data about an insurance policy and a loan of a first party, determining a deductible amount of the insurance policy using a computing device and adding at least a portion of the deductible amount to a principal balance of the loan using a computing device. The method can include the entire deductible amount being added to the principal balance when the loan is originated. The method can include a portion of the deductible amount being added to the principal balance after the loan is originated. The method can include the deductible amount being escrowed to the loan over a time period. The method can include determining an escrow payment for the deductible amount using the computing device. The method can include accruing interest on the deductible amount. The method can include paying the deductible amount to the first party.

In further examples, the above method steps are stored on a machine-readable medium comprising instructions, which when implemented by one or more processors perform the steps. In yet further examples, subsystems or devices can be adapted to perform the recited steps. Other features, examples, and embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for interface presentation are described. In the following description, for purposes of explanation, numerous specific details are set forth in order to provide a thorough understanding of example embodiments. It will be evident, however, to one skilled in the art that the present invention may be practiced without these specific details.

Figure 1:
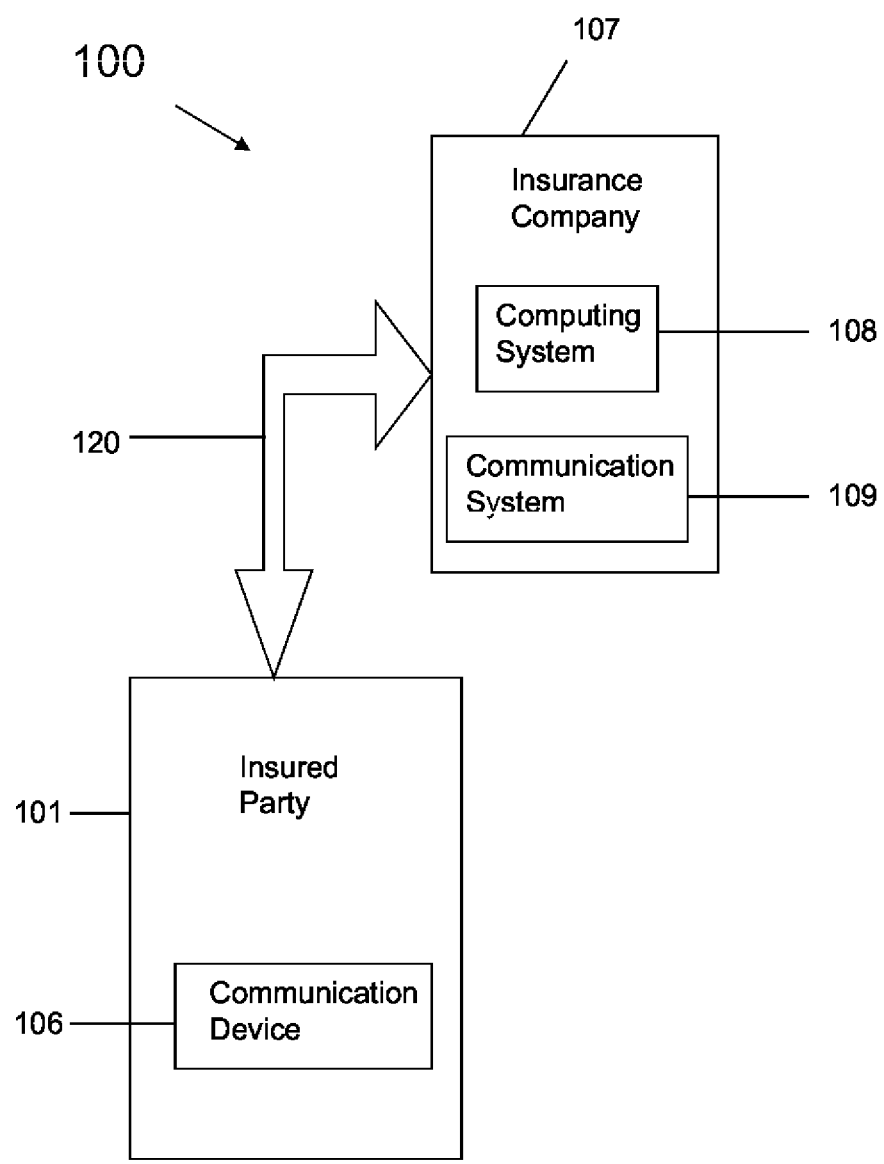
FIG. 1 is a schematic diagram of a system according to an example embodiment.

FIG. 1 illustrates an example computer and communication system 100, which can include an individual, such as an insured individual or insured party 101, who can communicate with an insurance company 107 through a communication network 120.

The insured party 101 in the present description is a person or other legal entity or group covered under an insurance policy with the insurance company 107. The insured can have multiple properties insured by the company 107. Examples can include personal property, such can personal items, home furnishings, antiques, vehicles, jewellery, boats, airplanes, recreational vehicles, businesses and business equipment etc. and real property, such as primary homes, land, second homes, etc.

An insurance policy is a type of contract between the insurance company and the insured party. In the event of damage or a loss to the insured property, the insurance company is obligated to a claim for the damage or loss as set forth in the insurance policy. The claim payment is typically subject to a deductible. A deductible is a portion of the damage or loss that the insurance company requires the insured party to pay before payments from the insurance company commence. Example deductibles are $250, $500, $1,000 or more. For example, auto insurance policies can have a deductible of $500. If the insured party is in an accident, the insured party must pay the first $500 of any damages before the insurance company is required to pay toward any of the accrued damages. For many individuals and insured parties, obtaining the deductible amount can be a major obstacle. In some situations, money for a deductible does not exist or may cause other important needs to go unfilled.

The insured party 101 may use a wide variety of communication devices 106 to communicate with and provide data to the insurance company 107. The communication devices 106 can be electronic devices. Many people today have electronic devices for communication, such as personal data assistants, mobile telephones, laptop computers, email devices, netbooks, etc. These devices provide various means of communication. The insured can also have a communication devices 106, such as land based telephones, social networking sites, networked email, pagers, internet etc. Certain information is associated with the insured that relate the insured with the insurance company. While shown with the insured 101, it will be recognized that this information can be stored at the insurance company as well. It is also recognized that the insurance company 107 may cause statements to be created, electronically communicated, printed, faxed or mailed in order to communicate with the insured party.

The insurance company 107 is a company that provides risk management that hedges an insured against the risk of a contingent loss. The insurance company will accept the risk of a loss from the insured in exchange for a premium. Generally, insurance can be thought of as a guaranteed small loss, i.e., the premium, to prevent a large, possibly devastating loss. The insurance company 107 includes a computing system 108 and a communication system 109. The computing system 108 includes an insured database, an accounting system, and a business rules system. Each of these systems can further include a storage system, an application system, and a server and support multiple users at any given time. The storage systems can store computer instructions to perform any step or method described herein on electronic computing devices, such processors, arithmetic logic units, application specific integrated circuits.

Within the computing system 108 are databases that store data with regard to the insured that can be used to determine policy coverage, policy terms, deductible amounts and premiums. The computing system 108 can further include business rules that act on the data. The computing system 108 and communication system 109 will be described in greater detail below with regard to FIG. 3.

Figure 2:
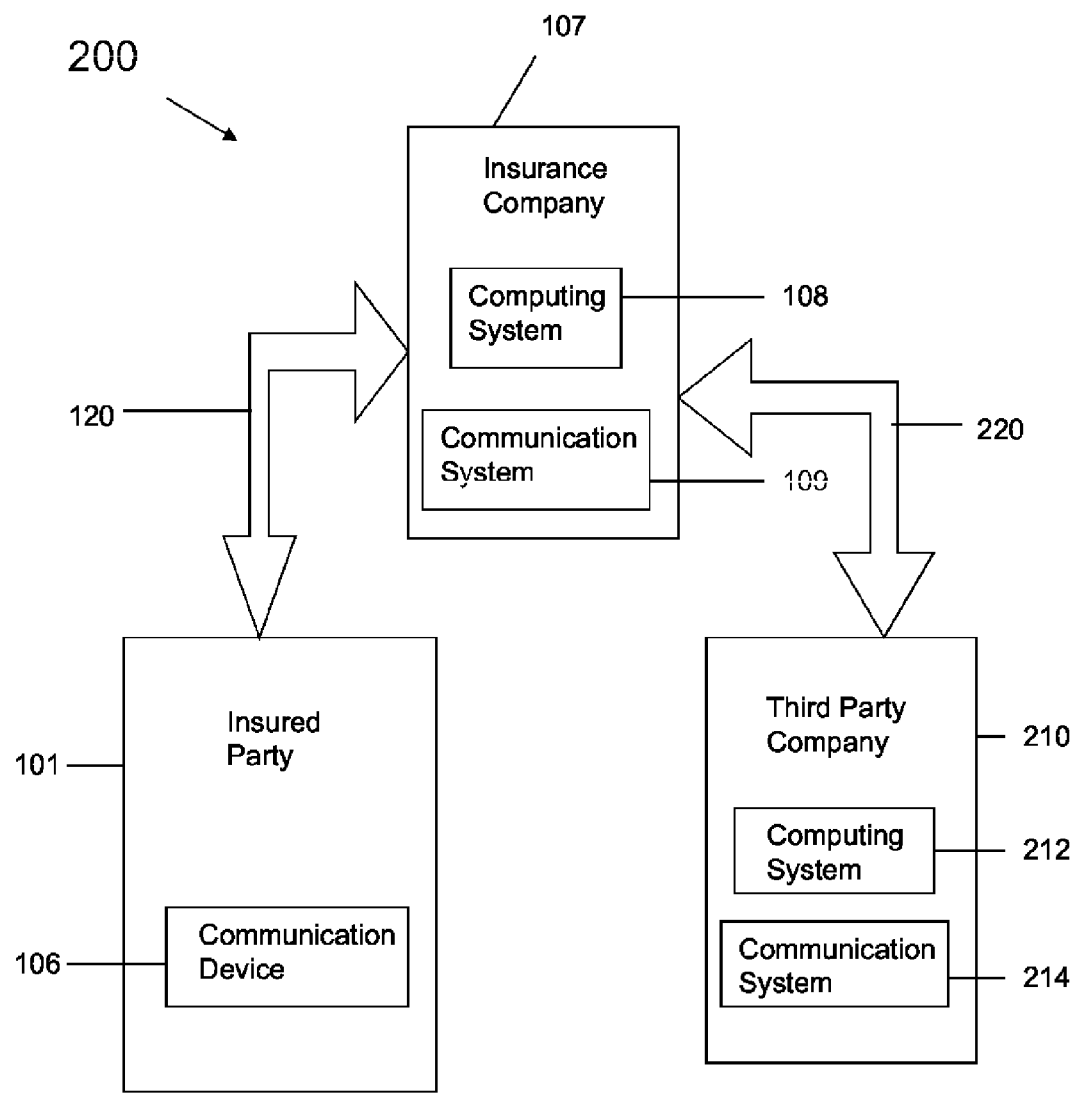
FIG. 2 is a schematic diagram of a system according to an example embodiment.

FIG. 2 illustrates a schematic view of a computer and communication system 200 which can include an individual, such as an insured individual or insured party 101, who can communicate with an insurance company 107 through a communication network 120 and a third party company 210 that can communicate with the insurance company 107 through a communication network 220.

The insured party 101 in the present description is a person covered under an insurance policy with the insurance company 107. The insured can have multiple properties insured by the company 107. Examples can include personal property, such can personal items, home furnishings, antiques, vehicles, jewellery, boats, airplanes, recreational vehicles, businesses and business equipment etc. and real property, such as primary homes, land, second homes, etc.

The third party company 210 can be a company such as another insurance company, an insurance broker or dealer or a lender such as a financial institution. An insurance broker or dealer is a re-seller of insurance for other insurance companies. A lender such as a financial institution can provide loans on various types of property. The lender may require that the loan property be covered against loss by insurance for at least the value of the loan amount.

The third party company 210 includes a computing system 212 and a communication system 214. The computing system includes a database, an accounting system, and a business rules system. Each of these systems can further include a storage system, an application system, and a server and support multiple users at any given time. The third party company 210 can use a wide variety of communication devices to communicate with and exchange data to the insurance company 107. In an example, if the third party company is a loan company, the loan company and the insurance company may exchange loan information and insurance information.

Certain information is associated with the insured that relate the insured with the insurance company and with the third party company. This information can be stored at the insurance company, at the third party company or at both the insurance company and the third party company.

Within the computing system 212 are databases that store data with regard to the insured that can be used to determine policy coverage, policy terms, deductible amounts, premiums, loan balances and payments.

Figure 3:
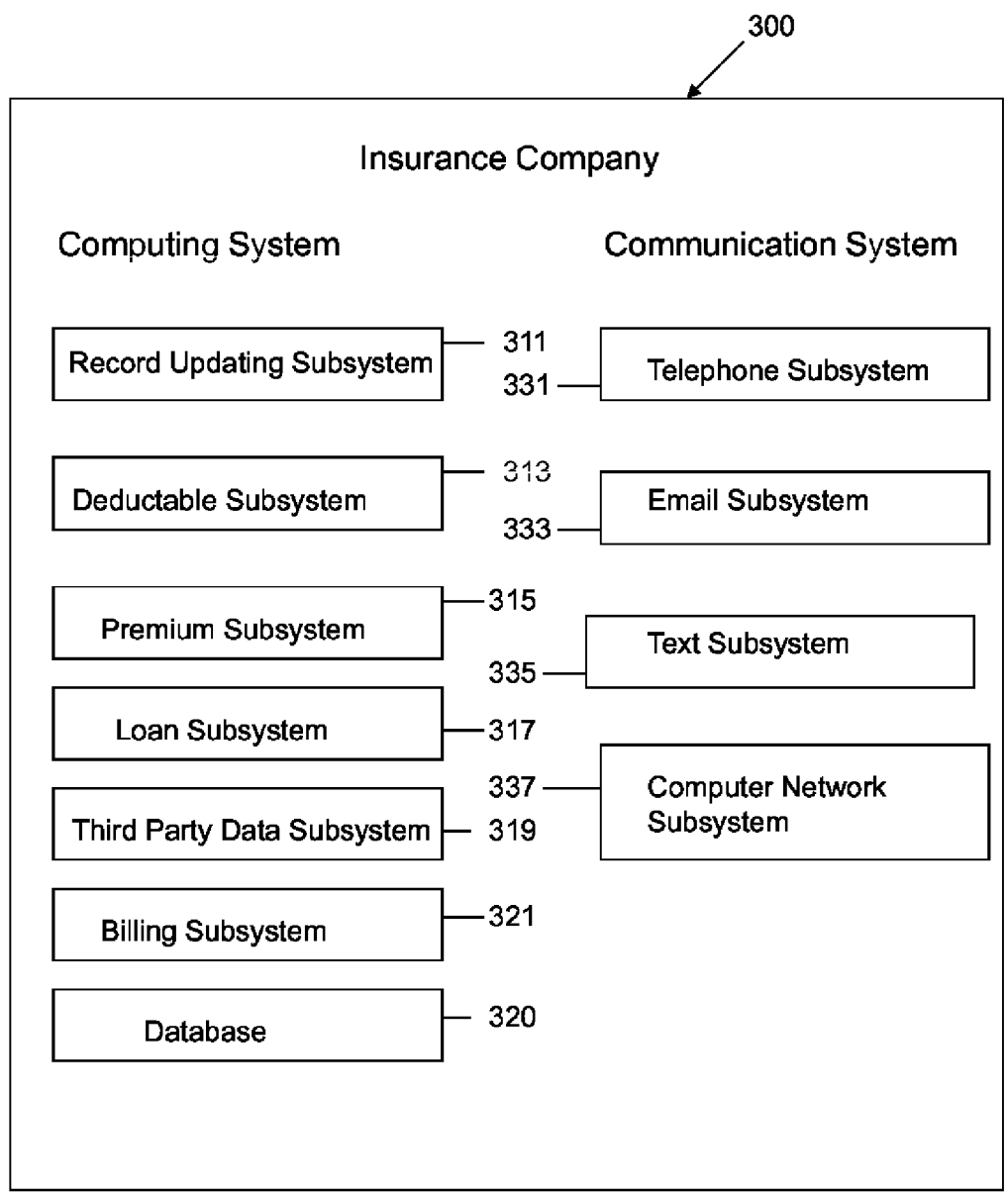
FIG. 3 is a schematic diagram of a company computing and communication system according to an example embodiment.

FIG. 3 illustrates a schematic view of a system 300 including various devices of the insurance company, e.g., 107 of FIGS. 1-2. The insurance company system 300 includes a computing system and a communication system that can each include a plurality of subsystems that are information handling systems that execute processes and perform operations (e.g., processing or communicating information) in response thereto, as discussed further below. Each such subsystem is formed by various electronic circuitry components, for example, processors, arithmetic logic units, application specific integrated circuits. In an example, any of the components of the computing machine 1100 (FIG. 10) can be included in a subsystem. The subsystems can each communicate with each other over a bus system (not shown).

A record updating subsystem 311 provides an interface to a user to update data records related to a user. Subsystem 311 can provide a graphical user interface to a user to input data such as, contact information, secondary contact information, emergency numbers, contact for relatives whom that insured would contact in an emergency, email addresses, text addresses, etc. The subsystem 311 can prompt the insured for this information at the time of applying for insurance or after. Further subsystem 311 can prompt a telephone representative to request this information from the insured.

A deductible subsystem 313 keeps track of the deductible amount of each insurance policy. Subsystem 313 can determine a total deductible amount for all insurance policies. Subsystem 313 can access database 320 or can keep a database of deductible amounts for each policy and if a deductible has been paid when a claim is filed.

Premium subsystem 315 can determine an insurance cost or premium for a supplemental insurance policy for a deductible amount of the primary insurance policy. Subsystem 315 may use or access a database of underwriting data such as risk factors, claim history, credit reports and criminal history. Subsystem 315 can use the underwriting data and past claim histories and claim payments to determine the value of the premium. Premium subsystem 315 may also cause billing statements to be sent out by various means.

A loan subsystem 317 can retrieve loan data from database 320 or receive loan data from a third party. Loan subsystem 317 can determine and keep track of loan payments, balances, terms and can keep track of a deductible portion of the loan payments and balances. Loan subsystem 317 can credit and debit payments and cause statements and bills to be sent.

A third party data subsystem 319 provides an interface to retrieve and interpret data from third party sources. This subsystem 319 can request data from various sources such as insurance brokers and dealers, banks, financial institutions, mortgage companies and vehicle loan companies. Third party subsystem 319 can be in communication with and exchange data with deductible subsystem 313, premium subsystem 315 and loan subsystem 313.

A billing subsystem 321 can cause causes billing statements and bills to be sent and can keep track of payments that have been made.

A database 320 stores the data for the company and can include magnetic storage, optical storage, or electronic storage of data. The database 320 can include a wide variety of data such as underwriting, actuarial and risk management data.

A telephone subsystem 331 includes devices that can communicate thorough telephone systems, e.g., those based on "plain old telephone service" (POTS), Public Switched Telephone Network (PSTN), voice over IP (VOIP), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, and others.

An email subsystem 333 includes devices and systems that can send an email communication to the insured at contacts stored in the database of the company.

A text subsystem 335 includes devices and systems that can send an electronic text communication to the insured at contacts stored in the database of the company.

A computer network subsystem 337 includes devices and systems that interface with other computer networks.

Figure 4:
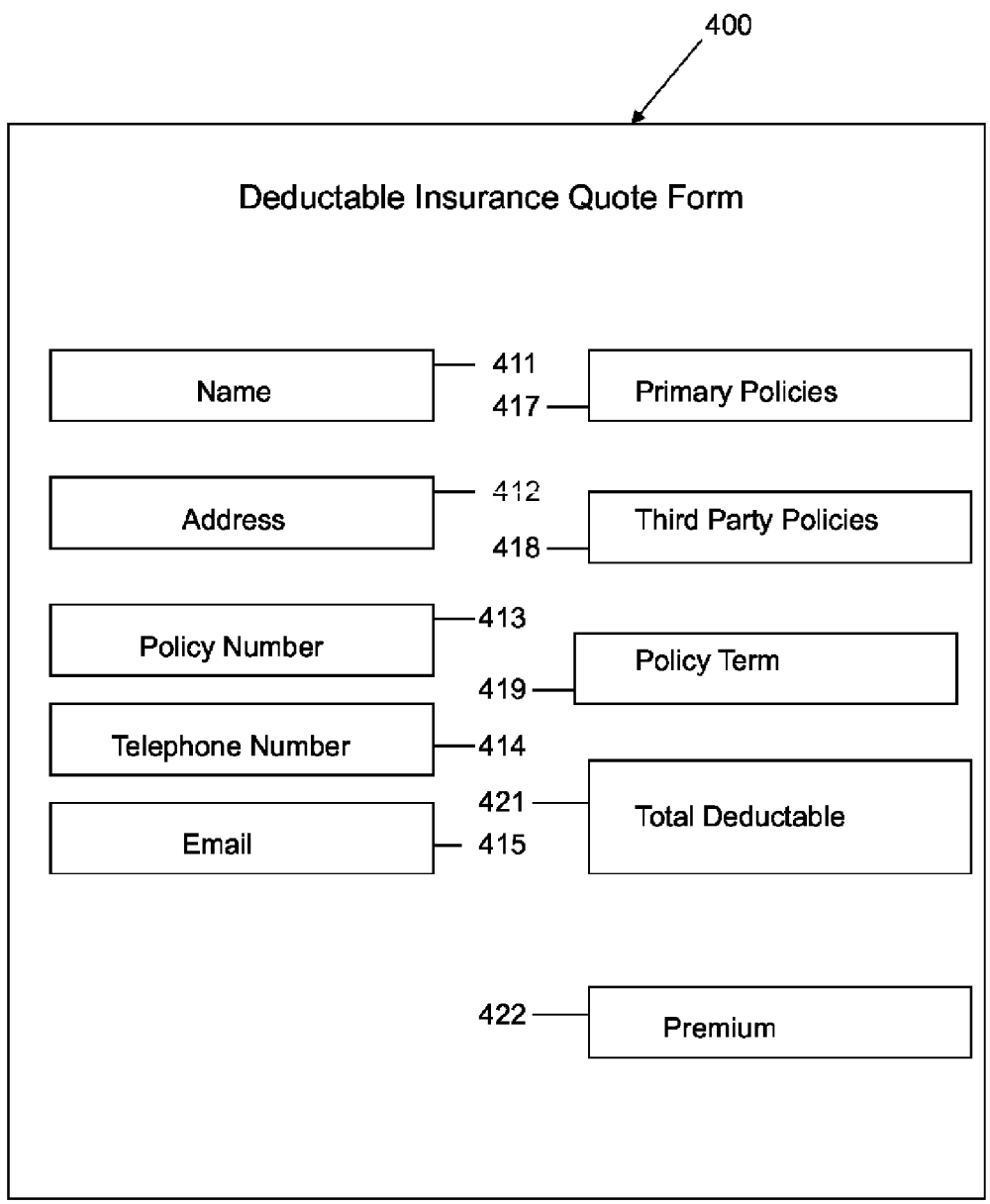
FIG. 4 is a schematic diagram of a deductible insurance quote form according to an example embodiment.

FIG. 4 illustrates an insurance quote form 400 that can be displayed on a graphical user interface, stored in a database, or printed. Quote form 400 can be presented to an insured party for review and assessment in regards to making a decision to accept additional insurance coverage for the deductible portion of the primary insurance policy. In an example of the present invention many of these claim fields are automatically populated with data in the company database or from a third party database once the insured's primary insurance policies are identified.

Quote form 400 includes fields 411-422 that represent data related to a deductible insurance quote. Field 411 represents the insured's name. Field 412 represents the insured's address. Field 413 represents the policy number. Field 414 represents the insured's telephone number(s). Field 415 represents the insured's email address(es). Field 417 represents the primary insurance policies that are to be covered by the quote for supplemental insurance on the deductible portions. Field 418 represents the insurance policies from third party insurance providers that are to be covered by the quote for supplemental insurance on the deductible portions. Field 419 represents the term or time period that the primary insurance policies are in effect. Field 421 represents the total amount of all the deductible portions of all insurance policies for all policy holders included in the present insurance quotation. Field 422 represents the amount or cost of the premium that the insured party would have to pay in order to obtain insurance on the deductible portions of their primary insurance policies. This is not an exhaustive list of all fields in quote form. These fields represent both fields that can be automatically completed or must await later entry.

Figure 5:
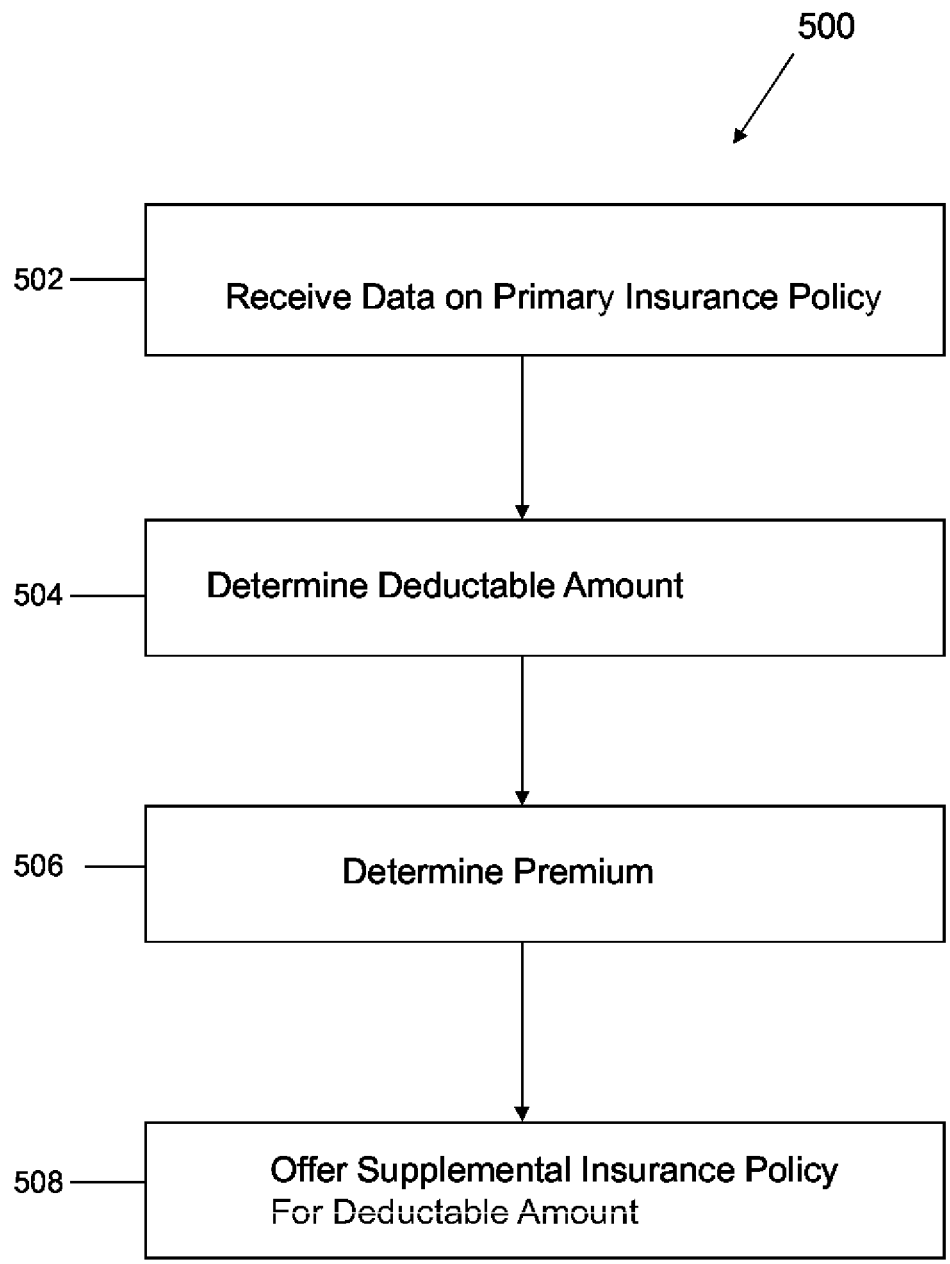
FIG. 5 is a flow chart of a method according to an example embodiment.

FIG. 5 illustrates a flow chart of a method 500 for providing a supplemental insurance policy for the deductible portion of a primary insurance policy. This method provides insurance in the event that the insured party is unable pay the deductible in the event of a claim.

At 502, data is received about a primary insurance policy. This can include data retrieved from a company database or can be directly input by the insured party via a communication device such as over the internet. The data can include information such as insured party's name, address, telephone number(s) and email address(es). The data can further include primary insurance policy information such as type of policy, covered property and items, terms of the insurance, time periods of coverage, amount of deductible, dollar value of coverage and limits. The data can further include data used for underwriting such as risk factors, claim history, credit reports and criminal history. The data received as step 502 can be stored in a database or electronic memory device and used for other steps and systems so that additional computations can occur. Storage can be in the company database, for example, in electronic memory devices.

At 504, the deductible amount is determined. The deductible amount can be determined from the data received in step 502 or may be determined or calculated using the insurance company computer system and database.

At 506, the premium or cost of the supplemental insurance policy for the deductible portion of the primary insurance policy is calculated or generated. The premium can be determined using the insurance company computer system and database. In an embodiment, the insurance company computer system can use underwriting data and past claim histories and payments to determine the value of the premium.

At 508, a supplemental insurance policy for the deductible portion of the primary insurance policy is offered to the insured party. The offer can be in the form of an insurance quote such as that shown in quote form 400 (FIG. 4). The quote can include the terms of coverage, the amount of the deductible insurance, period of effect and cost or premium. The supplemental insurance policy can be offered through a variety of communication channels. For example, the supplemental insurance policy may be offered via a communication of at least one of a text message, an email, a telephone call, a fax, in person, postal mail, or through a website. The company computer system can automatically offer the supplemental insurance policy for the deductible portion of the primary insurance policy through at least one communication channel. The communication of the offer may be monitored to ensure that the offer is received. In the case of telephone calls, the call can be automatically monitored to ensure a person answers the phone and the message is received. In the case of email messages, a return receipt can be requested.

In an example, the insured party may accept the offer of supplemental deductible insurance and pay the premium to the insurance company. The insurance company may receive the payment for the supplemental deductible insurance policy. The payment may be made by any suitable means including cash, check, wire transfer or electronic funds transfer. In an example, the payment may be divided into regular periodic payments that are electronically debited from an account of the insured party. The insurance company computer system may regularly send out debit requests to the insured party's financial institutions on a periodic basis.

In an example, the same insurance company may provide the primary insurance policy and supplemental deductible insurance policy; in this case the billing for both insurance policies may be combined. In the event of a claim loss, the insurance company can pay the deductible to or on behalf of the insured party.

By purchasing a supplemental deductible insurance policy, the insured party may be able to select a higher level of deductible amount on the primary insurance policy thereby reducing or lowering their primary insurance cost. The use of supplemental deductible insurance can result in cost savings to the insured party. For example, assume an insured party has a primary insurance policy with a $500 deductible that costs $1200 per year. If the deductible is increased to $1000, the primary insurance policy costs $1000 per year. If the cost of the supplemental deductible insurance for a $500 deductible is $50 per year. The insured party would realize a cost savings of $150 per year using the supplemental deductible insurance.

Figure 6:
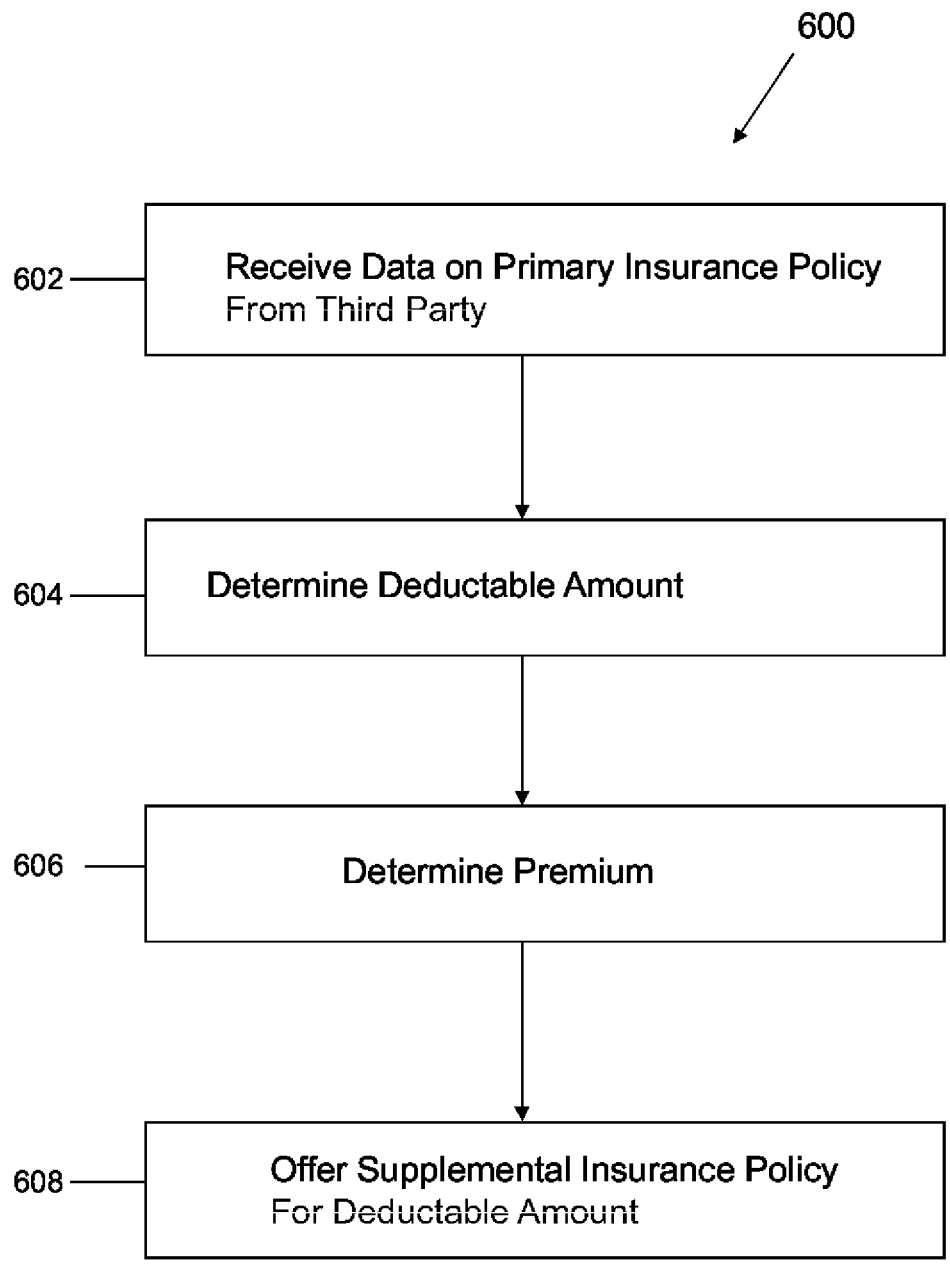
FIG. 6 is a flow chart of a method according to an example embodiment.

FIG. 6 illustrates a flow chart of a method 600 for providing a supplemental insurance policy for the deductible portion of a primary insurance policy through a third party insurance provider. A third party insurance provider may be a party other than the insured party or the insurance company. In an example, a third party insurance provider may be another insurance company, an insurance broker or dealer, a bank or a financial services company. This method provides insurance in the event that the insured party is unable pay the deductible in the event of a claim.

At 602, data is received about a primary insurance policy from a third party company. This can include data directly received from a third party insurance company database or computer system and data indirectly received such as through an insurance broker or dealer or other financial services provider. The data can be received by the insurance company computer system via a communication device such as over networks like internet or other electronic communication networks. The data from the third party provider may be in printed form and may be manually entered into the insurance company database. Alternatively, the data may be entered using a semi-manual method such as electronic scanning.

The data received from the third party company can include information such as insured party's name, address, telephone number(s) and email address(es). The data can further include primary insurance policy information such as type of policy, covered property and items, terms of the insurance, time periods of coverage, amounts of deductible and limits. The data can further include data used for underwriting such as risk factors, claim history, credit reports and criminal history. The data received as step 602 can be stored in an electronic memory device and used for other steps and systems so that additional computations can occur. Storage can be in the company database, for example, in electronic memory devices.

At 604, the deductible amount is determined. The deductible amount can be determined from the data received in step 602 or may be determined or calculated using the insurance company computer system and database.

At 606, the premium or cost of the supplemental insurance policy for the deductible portion of the primary insurance policy is calculated or generated. The premium can be determined using the insurance company computer system and database. In an embodiment, the insurance company computer system can use underwriting data and past claim histories and payments to determine the value of the premium.

At 608, a supplemental insurance policy for the deductible portion of the primary insurance policy is offered to the insured party. The offer can be in the form of an insurance quote such as that shown in quote form 400 (FIG. 4). The quote can include the terms of coverage, the amount of the deductible insurance, period of effect and cost or premium.

The supplemental insurance policy can be offered through a variety of communication channels. In an example, the supplemental insurance policy may be offered by the third party provider such as the third party insurance company or an insurance broker or dealer. In an example, the supplemental insurance policy may be offered via a communication of at least one of a text message, an email, a telephone call, a fax, a letter or through a website. The company computer system can automatically offer the supplemental insurance policy for the deductible portion of the primary insurance policy through at least one communication channel. The communication of the offer may be monitored to ensure that the offer is received.

In an example, the insured party may accept the offer of supplemental deductible insurance and pay the premium to the insurance company. The insurance company may receive the payment for the supplemental deductible insurance policy. The payment may be made by any suitable means including cash, check, wire transfer or electronic funds transfer. In an example, the payment may be divided into regular periodic payments that are electronically debited from an account of the insured party. The insurance company computer system may regularly send out debit requests to the insured party's financial institutions on a periodic basis. The time period of coverage of the supplemental deductible insurance policy can be the same as or coincide with the term of coverage of the primary insurance policy.

In an example, different insurance companies may provide the primary insurance policy and the supplemental deductible insurance policy; in this case the billing for each insurance policy is separate. Therefore, an insured party may purchase a supplemental deductible insurance policy from a first insurance company to cover or insure a primary insurance policy from a second insurance company or insurance broker.

In the event of a claim loss, the insurance company can pay the deductible to or on behalf of the insured party.

Figure 7:
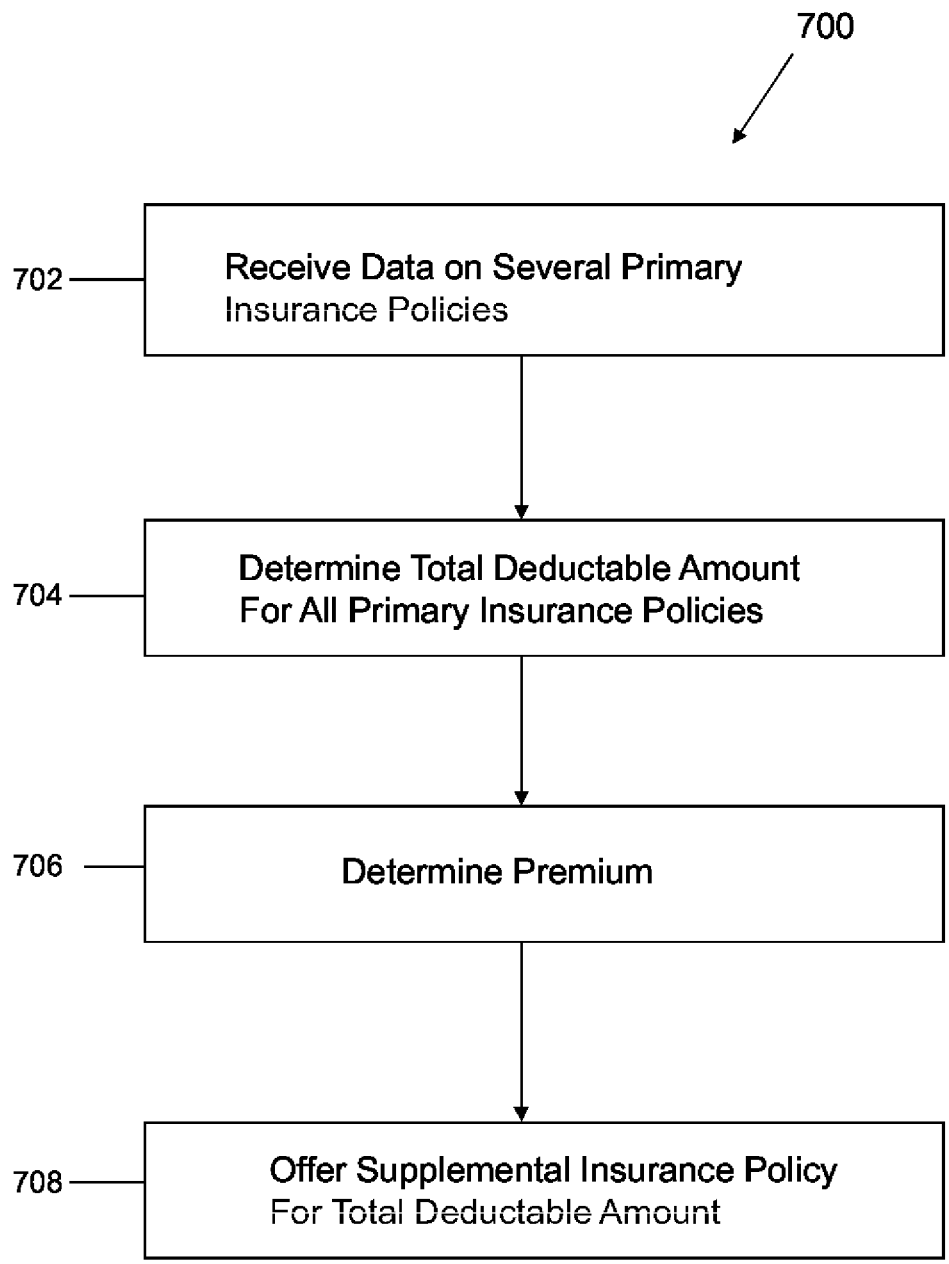
FIG. 7 is a is a flow chart of a method according to an example embodiment.

FIG. 7 illustrates a flow chart of a method 700 for providing a supplemental insurance policy for the deductible portion of several primary insurance policies. This method provides insurance for one or more insurance policy deductibles.

At 702, data is received about several primary insurance policies. Individuals and insured parties typically have more than one insurance policy. An insured party may have a home owner's insurance policy, an auto insurance policy and a boat insurance policy. Each of these insurance policies typically has a deductible amount that has to be provided or satisfied by the insured party before payment from the insurance company commences on the balance of the claim damages. The data can include data retrieved from a company database or can be directly input by the insured party via a communication device such as over the internet. The data can include information such as insured party's name, address, telephone number(s) and email address(es). The data can further include primary insurance policy information such as type of policies, covered property and items, terms of the insurance, time periods of coverage, amount of deductibles and limits. The data can further include data used for underwriting such as risk factors, claim history and credit reports. The data received as step 702 can be stored in an electronic memory device and used for other steps and systems so that additional computations can occur. Storage can be in the insurance company database, for example, in electronic memory devices.

At 704, the total amount of the deductibles for all of the insurance policies is determined. The total deductible amount can be determined by adding each of the individual primary insurance policy deductibles. The total deductible amount can be determined from the data received in step 702 or may be determined or calculated using the insurance company computer system and database.

At 706, the premium or cost of the supplemental insurance policy for the total deductible portion of the multiple primary insurance policies is calculated or generated. The premium can be determined using the insurance company computer system and database. In an embodiment, the insurance company computer system can use underwriting data and past claim histories and payments to determine the amount of the premium.

At 708, a supplemental insurance policy for the total deductible portion of the primary insurance policies is offered to the insured party. The offer can be in the form of an insurance quote such as that shown in quote form 400 (FIG. 4). The quote can include the terms of coverage, the total amount of the deductible insurance, period of effect and cost or premium.

In an example, the quote may include allowing the insured party to select which primary insurance policies are to be included in the supplemental deductible insurance policy. If the insured party has a home, auto and boat insurance policy, they may elect to purchase deductible insurance only for the home and auto insurance policies.

The supplemental insurance policy for all of the insurance policies can be offered through a variety of communication channels. For example, the supplemental insurance policy may be offered via a communication of at least one of a text message, an email, a telephone call, a fax, by printing and mailing or through a website. The insurance company computer system can automatically offer the supplemental insurance policy for the deductible portion of the primary insurance policy through at least one communication channel.

In an example, in the event a claim is made in one of the primary insurance policies, only the deductible amount for that policy may be paid instead of the total deductible amount. For example, assume that the insured party has purchased deductible insurance for their home and auto policies. In the event of an automobile accident and claim, the supplemental insurance policy may only pay the deductible portion of the auto insurance policy.

In an example, the insured party may accept the offer of supplemental deductible insurance and pay the premium to the insurance company. The insurance company may receive the payment for the supplemental deductible insurance policy. The payment may be made by any suitable means including cash, check, wire transfer or electronic funds transfer. In an example, the payment may be divided into regular periodic payments that are electronically debited from an account of the insured party. The insurance company computer system may regularly send out debit requests to the insured party's financial institution on a periodic basis. The time period of coverage of the supplemental deductible insurance policy can be the same as or coincide with the term of coverage of the primary insurance policy.

In an example, the same insurance company may provide the primary insurance policies and the supplemental deductible insurance policy; in this case the billing for all insurance policies may be combined.

Figure 8:
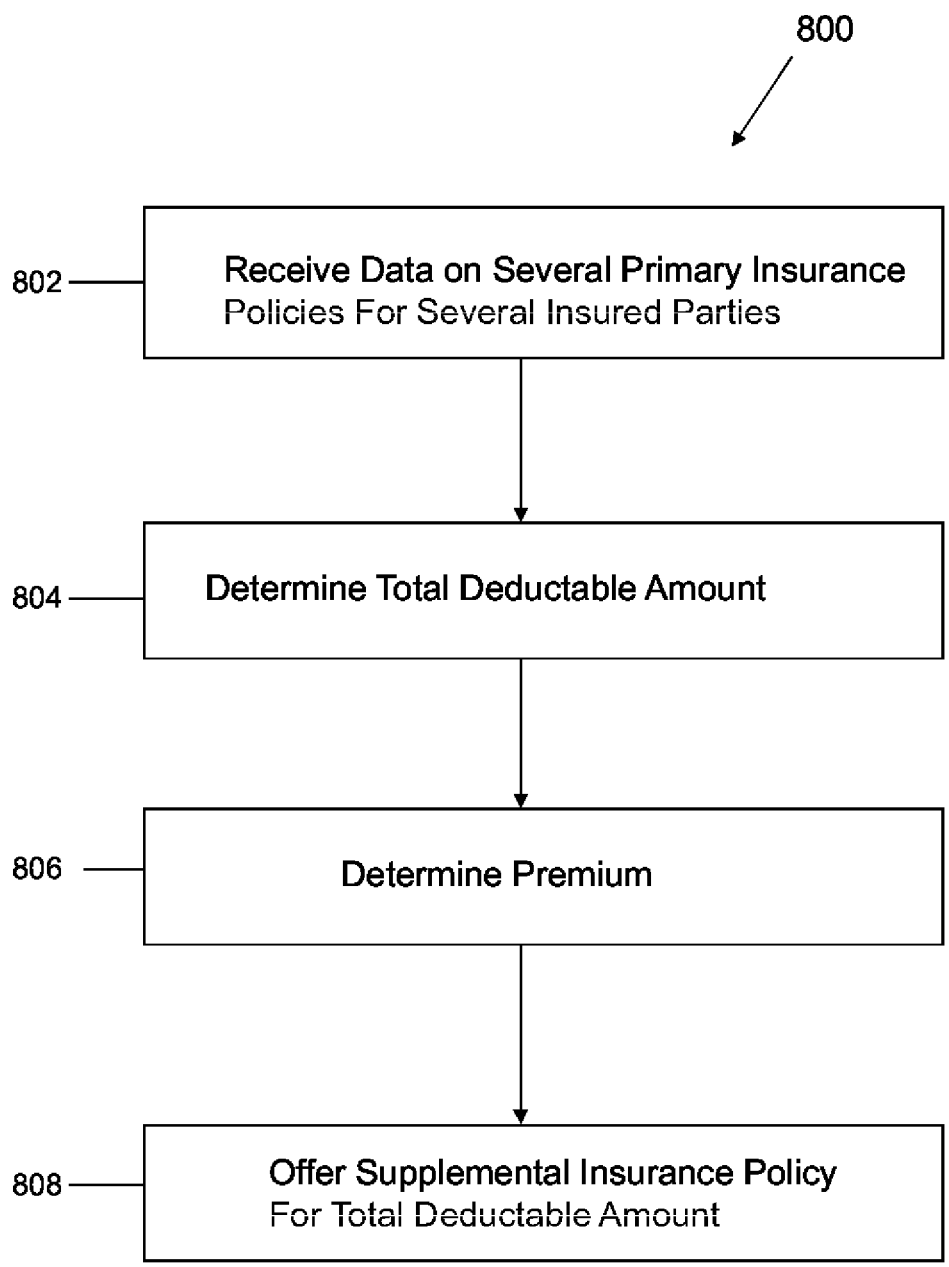
FIG. 8 is a is a flow chart of a method according to an example embodiment.

FIG. 8 illustrates a flow chart of a method 800 for providing a supplemental insurance policy for the deductible portion of several primary insurance policies for several insured parties. This method provides insurance for one or more insurance policy deductibles for one or more insured individuals.

The insured parties may be related or not related in some pre-determined manner as defined by the insurance company. The insured parties may be members of a group or may form a group, alliance or may be designated as an affinity group. In an example, the insurance company may offer supplemental deductible insurance for all the insurance policies for all of the immediate members of a family group. This may be called family deductible insurance. The family group may be defined as the parents (husband and wife) and any children of the parents. In another example, the family group may be defined to include an extended family. For example, the family group may include parents, children and grandparents. In another example, the group may include employees of a company or members of an organization.

At 802, data is received about several primary insurance policies for several insured parties in a defined affinity group. The insurance company can define the members of the group. Individuals and insured parties typically have more than one insurance policy. Family members typically have more than one insurance policy. For example, a husband, wife, son and daughter may each have an auto or vehicle insurance policy. An insured party may have a home owner's insurance policy, an auto insurance policy and a boat insurance policy. Each of these insurance policies typically has a deductible amount that has to be provided or satisfied by the insured party before payment from the insurance company commences on the balance of the claim damages. The data can include data retrieved from a company database or can be directly input by the insured party via a communication device such as over the internet. The data can include information such as insured party's name, address, telephone number(s), and email address(es). The data can further include primary insurance policy information such as type of policies, covered property and items, terms of the insurance, time periods of coverage, amount of deductibles and limits. The data can further include data used for underwriting such as risk factors, claim history, credit reports and criminal history. The data received as step 802 can be stored in an electronic memory device or database and used for other steps and systems so that additional computations can occur. Storage can be in the company database, for example, in electronic memory devices.

At 804, the total amount of the deductibles for all of the insurance policies for all of the insured parties belonging to the affinity group is determined. The total deductible amount can be determined by adding each of the individual primary insurance policy deductibles for each of the insured parties in the group. The total deductible amount can be determined from the data received in step 802 or may be determined or calculated using the insurance company computer system and database.

At 806, the premium or cost of the supplemental insurance policy for the total deductible portion of the multiple primary insurance policies for the multiple insured parties is calculated or generated. The premium can be determined using the insurance company computer system and database. In an embodiment, the insurance company computer system can use underwriting data and past claim histories and payments to determine the amount of the premium.

At 808, a supplemental insurance policy for the total deductible portion of the primary insurance policies is offered to the insured party(s) member(s). The offer can be in the form of an insurance quote such as that shown in quote form 400 (FIG. 4). The quote can include the terms of coverage, the total amount of the deductible insurance, period of effect and cost or premium. In an example the quote may be directed to single member of the affinity group of policy holders. For example, the quote may be directed to a main or primary policy holder.

In an example, the quote may include allowing the insured party to select which primary insurance policies and which insured party members of the group are to be included in the supplemental deductible insurance policy. If the insured party has a home, auto and boat insurance policy, they may elect to purchase deductible insurance only for the home and auto insurance policies. If the members of the group include a husband, wife, a son and daughter, the members may elect to purchase deductible insurance only for the son and daughter.

The supplemental insurance policy for all of the insurance policies can be offered through a variety of communication channels. For example, the supplemental insurance policy may be offered via a communication of at least one of a text message, an email, a telephone call, a fax, in person, mail, or through a website. The company computer system can automatically offer the supplemental insurance policy for the deductible portion of the primary insurance policy through at least one communication channel.

In an example, in the event a claim is made in one of the primary insurance policies, only the deductible amount for that policy may be paid instead of the total deductible amount. For example, assume that the insured party has purchased deductible insurance for their home and auto policies. In the event of an automobile accident and claim, the supplemental insurance policy may only pay the deductible portion of the auto insurance policy.

In an example, the insured party may accept the offer of supplemental deductible insurance and pay the premium to the insurance company. The payment may be paid by the primary policy holder of the group. The insurance company may receive the payment for the supplemental deductible insurance policy. The payment may be made by any suitable means including cash, check, wire transfer or electronic funds transfer. In an example, the payment may be divided into regular periodic payments that are electronically debited from an account of the insured party. The insurance company computer system may regularly send out debit requests to the insured party's financial institutions on a periodic basis. The time period of coverage of the supplemental deductible insurance policy can be the same as or coincide with the term of coverage of the primary insurance policy.

Figure 9:
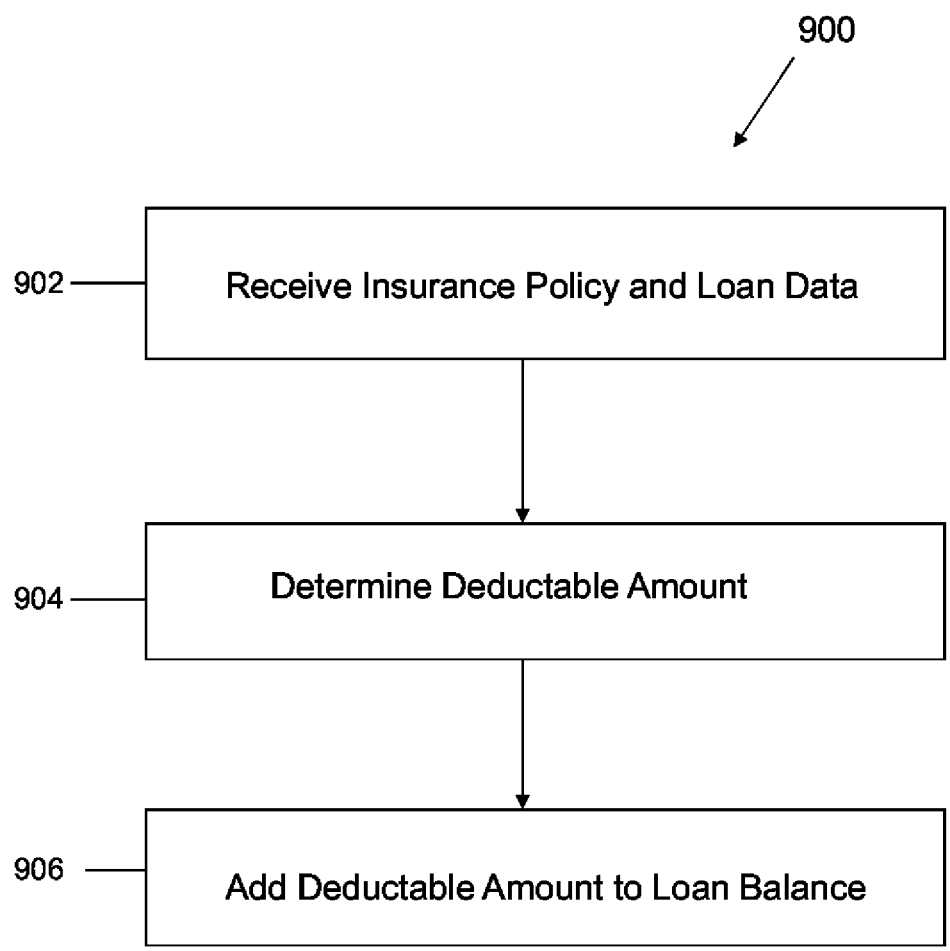
FIG. 9 is a flow chart of a method according to an example embodiment.

FIG. 9 illustrates a flow chart of a method 900 for adding the deductible amount of an insurance policy to a loan. This method allows access by an insured party to the funds necessary to pay the deductible amount of an insurance policy.

At 902, data is received about an insurance policy and a loan. The insurance policy can insure the tangible property or assets of the loan from loss. The insurance policy and loan can be for almost any type of property. In an example, the loan and insurance policy can be for an auto or vehicle, a home, a business, a boat, an airplane, household goods, a motorcycle or a recreational vehicle.

Step 902 can include data retrieved from a company database, a third party company database or can be directly input by the insured party via a communication device such as over the internet. The data can include information such as insured party's name, address, telephone number(s), and email address(es). The data can further include insurance policy information such as type of policy, covered property and items, terms of the insurance, time periods of coverage, amount of deductibles and limits. The data can further include loan data such as initial loan amount, principal loan balance, interest rate, term of loan, penalties for late payments and name of the lending institution and contact information of the lending institution.

The data can further include data used for underwriting such as risk factors, claim history and credit reports. The data received at step 902 can be stored in an electronic memory device and used for other steps and systems so that additional computations can occur. Storage can be in the insurance company computer system database, for example, in electronic memory devices.

At 904, the deductible amount of the insurance policy is determined. The deductible amount can be determined from the data received in step 902 or may be determined or calculated using the insurance company computer system and database.

At 906, the deductible amount of the insurance policy is added to the principal balance of the loan. In an example, the entire deductible amount may be added to the loan when the loan is originated. In another example, the deductible amount may be added to the loan a period of time after the initial loan repayment has started. The loan may have a clause written into the loan that allows the principal balance of the loan to be extended or added by the deductible amount of the insurance policy. When an insured party is involved in a claim, the insured party is assured of always having access to the deductible cash amount required by the insurance policy by electing to increase the loan balance by the deductible amount. After the deductible amount has been added to the loan balance, the loan terms may be modified in order to pay off the additional deductible amount on the loan balance. In an example, the loan payment amount, term or interest rate may be modified in order to fully pay the new loan balance.

The deductible amount can be added to the loan balance using the insurance company computer system and database. The deductible amount can be also be added to the loan balance when the loan is held by a third party using the insurance company computer system and database. For example, if the loan is held by a third party bank or financial institution, the insurance company computer system may send a communication to the third party bank or financial institution computer system instructing that the deductible amount be added to the loan balance of the insured party.

In an example, the deductible amount may be divided into a series of periodic payments for the deductible amount with the payment added to the monthly loan payment. A portion of the deductible amount is added to the principal balance with each payment. In this manner, the deductible amount is escrowed and increases over time. The loan payments may be electronically debited from an account of the insured party. The loan company computer system may forward the partial payment for the deductible to the insurance company computer system for crediting to the insured party's account. In this manner, the deductible increases over the life of the loan, until at the end of the loan, the deductible is fully funded. At the end of the loan, the deductible amount may be returned to the insured party. The return of the deductible amount may be with or without accrued interest.

The addition of the deductible to the loan allows an insured party to elect to select a deductible or can allow the insured party to select a larger deductible amount. Because the deductible amount is either already added to the loan, can be added to the loan or is being escrowed to the loan, the insured party can be confident that the deductible amount is always available in the event of a claim.

The entire deductible amount can be added to the loan at the beginning of the loan or a portion of the deductible can be added to each periodic loan payment such that deductible amount is escrowed and increases over time. By escrowing or saving the deductible amount of an insurance policy, the insured party may be able to select a higher level of deductible amount on the primary insurance policy thereby reducing or lowering their primary insurance cost.

Figure 10:
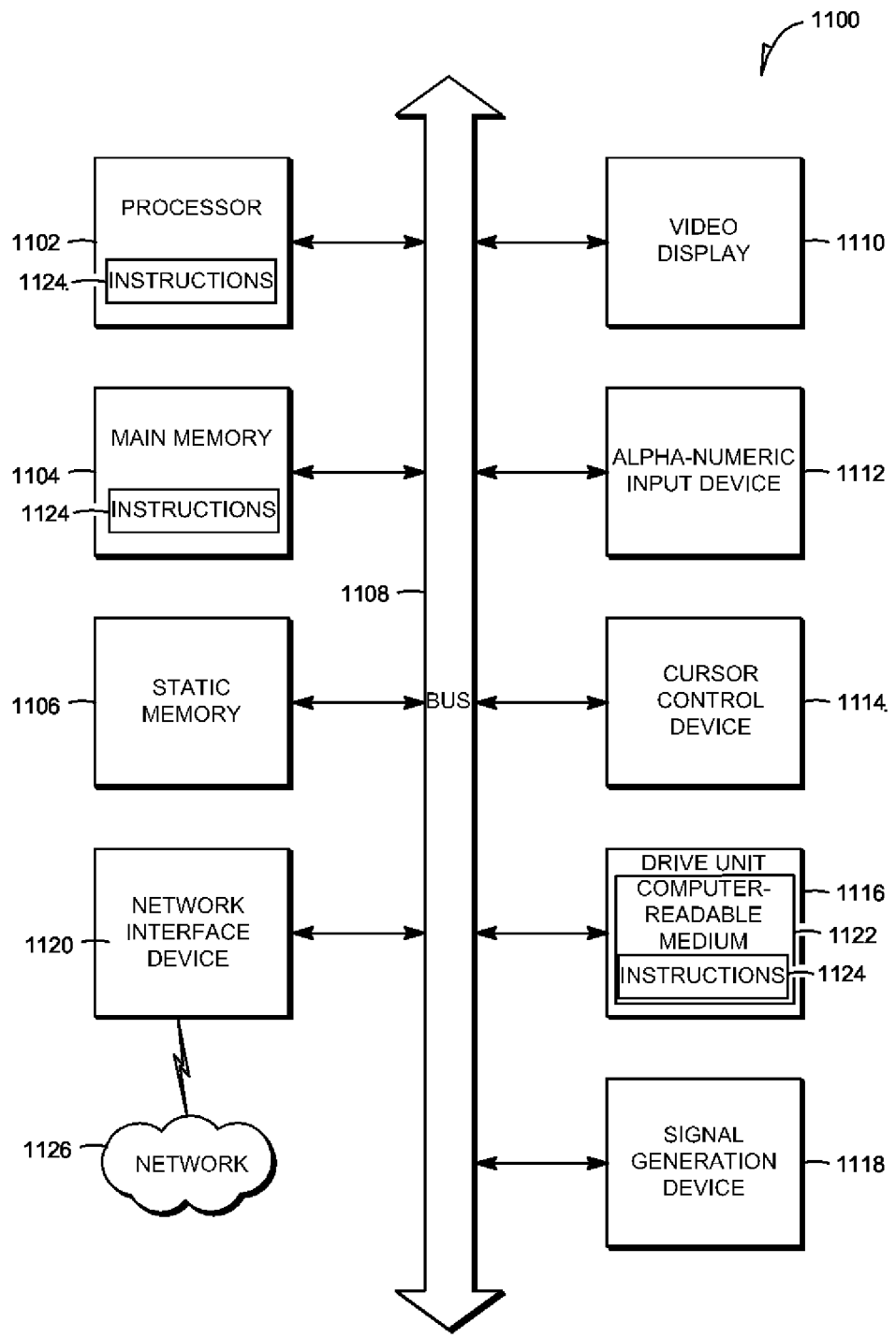
FIG. 10 is a schematic view of a subsystem according to an example embodiment.

FIG. 10 shows a diagrammatic representation of machine in the example form of a computer system 1100 within which a set of instructions may be executed causing the machine to perform any one or more of the methods, processes, operations, applications, or methodologies discussed herein. The computing systems of the insurance company 107 (FIG. 1), the third party company 210 (FIG. 2) can each include at least one of the computer systems 1100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1110. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a drive unit 1116, a signal generation device 1118 (e.g., a speaker) and a network interface device 1120.

The drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

An example of a mobile device for use with the methods and systems described herein is self-powered wireless device capable of a wide-area or local wireless communication with a plurality of other of hand-held, mobile, self-powered wireless devices or with base stations that are at a fixed location. The hand-held, mobile, self-powered wireless device can contain a memory, a human input device, a display, and an imaging device. The memory stores a plurality of data relating to an application data, and other data. Hand-held as used in the present disclosure can be devices small enough to be held in a human's hand. Wireless network as used in the present disclosure can be a wireless network capable of transmitting data over thousands of feet, for example, a wireless telephone network or wireless computer network or a peer-to-peer network. Self-powered as used in the present disclosure describes a device that will have self-contained power available wherever the user wants to take the device away from a base or stationary source of power. In one example, self-powered devices can be powered by a rechargeable battery, e.g., a lithium-ion battery. In an example, a fuel cell can be the mobile, self-power source. In another example, a mobile device is not fixed-location equipment such as desktop personal computer.

Aspects of the embodiments are operational with numerous other general purpose or special purpose computing environments or configurations can be used for a computing system. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The communication systems and devices as described herein can be used with various communication standards to connect. Examples include the Internet, but can be any network capable of communicating data between systems. other communication standards include a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Wireless communications can occur over a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. Communications network 22 may yet further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

The present methods and systems described herein can allow the insurance company to provide insurance for the deductible portion of a primary insurance policy in an efficient and cost effective manner. The deductible insurance policy may be provided for one or more primary insurance policies and for one or more policy holders in an affinity group. The primary insurance policy may be sourced or held by a third party company such as an insurance broker or dealer. By purchasing a supplemental deductible insurance policy, the insured party may be able to select a higher level of deductible amount on the primary insurance policy thereby reducing or lowering their primary insurance cost. The use of supplemental deductible insurance can result in cost savings to the insured party.

The deductible amount can also be added to the loan balance on the insured property. The entire deductible amount can be added to the loan at the beginning of the loan or a portion of the deductible can be added to each periodic loan payment such that deductible amount is escrowed and increases over time. By escrowing or saving the deductible amount of an insurance policy, the insured party may be able to select a higher level of deductible amount on the primary insurance policy thereby reducing or lowering their primary insurance cost. The use of adding the deductible to a loan can result in cost savings to the insured party.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

Thus, methods and systems for population of an application have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one subsystem, within the system, to receive data about a first insurance policy of an insured party;
   at least one subsystem, within the system, to determine a deductible amount of the first insurance policy;
   at least one subsystem, within the system, to determine a premium to insure the deductible amount using a computing device;
   at least one subsystem, within the system, to offer a quote for a second insurance policy for the deductible amount to the insured party; and
   at least one subsystem, within the system, to pay the deductible amount to the insured party in the event of a claim against the first insurance policy.

2. The system of claim 1, wherein at least one subsystem to add the premium for the second insurance policy to a first insurance policy premium.

3. The system of claim 1, wherein a first company provides the first insurance policy and a second company provides the second insurance policy.

4. The system of claim 1, wherein at least one subsystem to automatically debit the premium on a periodic basis from an insured party account.

5. The system of claim 1, wherein at least one subsystem is adapted to receive data about a plurality of insurance policies.

6. The system of claim 1, wherein at least one subsystem is adapted to determine the premium using underwriting data.

7. A system comprising:
   at least one subsystem, within the system, to receive data about an insurance policy of an insured party from a third party computer system;
   at least one subsystem, within the system, to determine a deductible amount of the insurance policy;
   at least one subsystem, within the system, to determine a premium for the deductible amount;
   at least one subsystem, within the system, to offer a supplemental insurance policy for the deductible amount to the insured party, the supplemental insurance policy having a term that coincides with a term of the insurance policy; and
   at least one subsystem, within the system, to pay the deductible amount to the insured party in the event of a claim against the supplemental insurance policy.

8. The system of claim 7, wherein at least one subsystem receives the premium for the supplemental insurance policy.

9. The system of claim 7, wherein the supplemental insurance policy is in effect for a time period that coincides with a time period that the insurance policy is in effect.

10. The system of claim 7, wherein at least one subsystem automatically debits the premium on a periodic basis from an insured party account.

11. The system of claim 7, wherein at least one subsystem is adapted to receive data about a plurality of insurance policies.

12. The system of claim 7, wherein at least one subsystem is adapted to determine the premium using underwriting data stored on a computing device.

13. A system comprising:
   at least one subsystem, within the system, to receive data about a plurality of insurance policies of an insured party;
   at least one subsystem, within the system, to calculate a total deductible amount for all of the insurance policies using a computing device;
   at least one subsystem, within the system, to determine a premium for the total deductible amount using the computing device;
   at least one subsystem, within the system, to offer a quote for a supplemental insurance policy for the total deductible amount to the insured party; and
   at least one subsystem, within the system, to pay the deductible amount to the insured party in the event of a claim against the supplemental insurance policy.

14. The system of claim 13, wherein at least one subsystem receives the premium for the supplemental insurance policy.

15. The system of claim 13, further comprising allowing the insured party to select which of the insurance policy deductibles are to be covered by the supplemental insurance policy.

16. The system of claim 13, wherein at least one subsystem automatically debits the premium on a periodic basis from an insured party account.

17. The system of claim 13, wherein the plurality of insurance policies consist of at least one of an auto insurance policy, a home insurance policy, a renters insurance policy, a boat insurance policy, a motorcycle insurance policy, valuable property insurance, juvenile insurance, or a recreational vehicle insurance policy.

18. The system of claim 13, wherein at least one subsystem is adapted to determine the premium using underwriting data.

19. A non-transitory machine-readable medium comprising instructions, which when implemented by a computer performs the following operations:
   receive data about a plurality of insurance policies for a plurality of insured parties, the plurality of insured parties forming a group;
   determine a total deductible amount for all of the insurance policies of the group;
   determine a premium to insure the total deductible amount;
   offer a quote for a supplemental insurance policy for the total deductible amount to the group; and
   paying a first deductible amount to the group in the event of a claim against the supplemental insurance policy.

20. The non-transitory machine-readable medium of claim 19, wherein the premium for the supplemental insurance policy is added to at least one of the insurance policy premiums.

21. The non-transitory machine-readable medium of claim 19, further comprising allowing at least one of the insured parties to select which of the insurance policy deductibles are to be covered by the supplemental insurance policy.

22. The non-transitory machine-readable medium of claim 19, wherein the premium is automatically deducted on a periodic basis.

23. The non-transitory machine-readable medium of claim 19, wherein the group consists of at least one of an immediate family, an extended family, employees of a business or members of an organization.

24. The non-transitory machine-readable medium of claim 19, wherein a primary policy holder is responsible for payment of the premium for the supplemental insurance policy.

25. A non-transitory machine-readable medium comprising instructions, which when implemented by a computer performs the following operations:
   receive data about an insurance policy and a loan of a first party;
   determine a deductible amount of the insurance policy;

offer a quote for a supplemental insurance policy for at least a portion of the deductible amount to the first party;

allow the first party to add the at least the portion of the deductible amount to a principal balance of the loan; and pay the deductible amount to the first party.

26. The non-transitory machine-readable medium of claim 25, wherein a total of the deductible amount is added to the principal balance when the loan is originated.

27. The non-transitory machine-readable medium of claim 25, at least the portion of the deductible amount is added to the principal balance after the loan is originated.

28. The non-transitory machine-readable medium of claim 25, wherein the deductible amount is escrowed to the loan over a time period.

29. The non-transitory machine-readable medium of claim 28, further comprising determining an escrow payment for the deductible amount using the computing device.

30. The non-transitory machine-readable medium of claim 25, further comprising accruing interest on the deductible amount.

* * * * *